(12) United States Patent
Henderson (10) Patent No.: US 9,109,720 B2
(45) Date of Patent: Aug. 18, 2015

(54) PRESS DEVICE FOR VALVE MAINTENANCE

(71) Applicant: James Henderson, San Marcos, CA (US)

(72) Inventor: James Henderson, San Marcos, CA (US)

( * ) Notice: Subject to any disclaimer, the term of this patent is extended or adjusted under 35 U.S.C. 154(b) by 134 days.

(21) Appl. No.: 13/928,554

(22) Filed: Jun. 27, 2013

(65) Prior Publication Data

US 2014/0158221 A1    Jun. 12, 2014

Related U.S. Application Data

(60) Provisional application No. 61/726,948, filed on Nov. 15, 2012.

(51) Int. Cl.
*F16K 43/00* (2006.01)
*F16L 55/00* (2006.01)

(52) U.S. Cl.
CPC .................. *F16K 43/00* (2013.01); *F16L 55/00* (2013.01); *Y10T 137/6109* (2015.04)

(58) Field of Classification Search
CPC .................................. F16K 43/00; F16L 55/00
USPC ....................... 137/315.41, 828; 251/187, 188
See application file for complete search history.

(56) References Cited

U.S. PATENT DOCUMENTS

| | | | | |
|---|---|---|---|---|
| 4,132,385 A * | 1/1979 | DeRouen et al. | ............. | 251/147 |
| 4,203,472 A * | 5/1980 | Dulaney | ........................ | 137/828 |
| 4,220,420 A * | 9/1980 | Aston et al. | .................... | 405/104 |
| 4,327,760 A * | 5/1982 | Lancaster | ................... | 137/15.03 |
| 6,286,329 B1 * | 9/2001 | Radichio | ......................... | 62/293 |
| 7,225,830 B1 * | 6/2007 | Kershaw | ..................... | 137/512.1 |
| 2011/0056240 A1 * | 3/2011 | Malik et al. | ..................... | 62/657 |
| 2011/0155937 A1 * | 6/2011 | Arnold | ........................... | 251/187 |

* cited by examiner

*Primary Examiner* — Craig Schneider
*Assistant Examiner* — Kevin Barss
(74) *Attorney, Agent, or Firm* — Timothy W. Fitzwilliam (57) ABSTRACT

A press device for valve leakage abatement while piping system maintenance is being performed is disclosed herein. Essentially, the device comprises a frame that can clamp down and provide pressure (and therefore seal) to the valve. The design further includes a vent or a test port to assist in determining if a pipe freezing apparatus is working. Also disclosed is a system for providing pipe maintenance to a water supply line wherein one or more pipe freezing apparatuses are employed in addition to the press device.

13 Claims, 7 Drawing Sheets

PRESS DEVICE FOR VALVE MAINTENANCE

PRIORITY CLAIM

This utility patent application contains subject matter claiming benefit of the priority date of U.S. Prov. Pat. App. Ser. No. 61/726,948, filed on Nov. 15, 2012, entitled "Angle Meter Stop Valve Removal System and Method;" accordingly, the entire contents of this provisional patent application is hereby expressly incorporated by reference.

BACKGROUND OF THE INVENTION

1. Field of the Invention

The present invention pertains generally to devices and methods for replacing failed leaking valves further wherein a section of pipe is frozen rather than isolating the valve. More particularly, the invention relates to a press device for valve leakage abatement, allowing for a pipe freezing and system maintenance to occur.

2. Description of the Prior Art

Pipe freezing apparatuses, for creating a dry section of pipe to be worked on downstream relative thereto, have been known for some time. A somewhat early example was proposed by Hallett, U.S. Pat. No. 5,987,906, entitled "Pipe Freezing Apparatus," and was awarded patent protection in 1999. Another example was developed by Ingram, U.S. Pat. No. 8,240,167 entitled "Cyrogenic Freezing Apparatus." Still further, an improved example is provided by present inventor Henderson, entitled "System and Method for Providing Upkeep and Maintenance to Piping Systems," U.S. patent application Ser. No. 13/840,973 which is incorporated herein by reference.

Regarding a specific application, it is routinely common for the angle meter stop valve in a water service line to a water meter at a residence or business establishment to need replacement due to corrosion or normal wear and tear. If the failed valve is leaking, it could hamper an ability to provide an adequate freeze since water will be continuously rushing past the freeze unless this leakage is somehow abated. This would be especially true for larger diameter pipes such as two inches or greater. Also in this water service line application, isolating the failed value within pipe system would require securing an entire water main which would affect multiple buildings and homes thereby resulting in unacceptable costs as a result of the maintenance.

In the event where the pipe freezing apparatus is unable to provide a seal due to a leaky valve, maintenance personnel have been known to crimp the (e.g. copper) pipe directly underneath the valve. Following the valve removal procedure, the crimped portion then must be cut away and the exposed pipe section reconnected to the new valve. The loss of the pipe section will result in the new valve being physically lower than the original design and is not preferred since it may compromise the integrity of the water system.

In light of the above, the present invention seeks to provide a device that will fit around a leaking valve and apply pressure thereto wherein further a seal is provided to cease any leakage past a valve stem. It is further an object of the invention to provide a valve press device that versatile to different sized pipes and different sized valves. It is still an additional object of the present invention to provide a test port to the press device to check if the pipe freezing apparatus is working properly. It is additionally an object of the present invention to provide an apparatus that is easy to use in a confined space and does not require external tools to operate.

BRIEF SUMMARY OF THE INVENTION

The present invention specifically addresses and alleviates the above mentioned deficiencies associated with the prior art. More particularly, the present invention, in a first aspect is directed a press device for valve leakage abatement (enabling pipe freezing by a pipe freezing apparatus), comprising: an outer frame of the device comprising a plurality of horizontal and vertical portions; an abutment surface configured to a lower portion of the outer frame (either on the frame itself, or alternatively on a hinged pipe size adaptor), the abutment surface juxtaposed to a suitable portion on an underside of the valve (or a corresponding pipe) to be maintained; and a forcing screw translationally configured to the outer frame, the forcing screw providing pressure to a top of a valve leveraged against the abutment surface, wherein said pressure assists in creating a seal at the valve leakage or downstream to the valve leakage.

Further in this aspect the invention may be characterized as wherein the forcing screw provides pressure to a top of the valve via a socket specifically designed to fit over the top of the valve. Additionally, the invention in this aspect comprises a hinged pipe size adaptor providing versatility to the press device fitting different sized pipes, wherein said pipe size adaptor is hingedly connected to the lower portion of the outer frame, wherein further the pipe size adaptor is the abutment surface in an in-use position.

Further to the forcing screw a forcing screw head is provided at an upper end thereof, the forcing screw head configured to be hand tightened or tightened via a tool. A socket is provided at the lower end of the forcing screw, the socket specifically comprises an o-ring for coupling the socket to the forcing screw; a semi-hollow interior configured to fit over the upper portion of the valve; and a test port for determining if a pipe freezing apparatus is working. The semi-hollow interior further comprises: a lower hollow interior providing a first seal to the top of the valve; and an upper hollow interior having a smaller diameter than the lower hollow interior, the upper hollow interior providing a second seal to the top of the valve.

In a second aspect the invention may be characterizes as a press device for valve leakage abatement (enabling pipe freezing by a pipe freezing apparatus), comprising: an upper horizontal beam portion; a lower horizontal beam substantially parallel to the upper horizontal beam portion; first and second lateral stanchions together with the upper and lower horizontal beam portions forming a frame of said device; an abutment surface configured to the lower horizontal beam surface (either on a surface of the lower horizontal beam, itself, or alternatively on a hinged pipe size adaptor), the abutment surface juxtaposed to a suitable portion on a pipe (or the valve itself) to be maintained; and a forcing screw translationally coupled trough the upper horizontal beam, the forcing screw providing pressure to a top of a valve leveraged against the abutment surface, wherein said pressure assists in creating a seal at the valve leakage or downstream to the valve leakage.

In still a third aspect, the invention may be characterized as a system for performing pipe maintenance comprising: a valve press device placed around a valve for temporary leakage abatement, wherein the pipe maintenance specifically comprises replacing the valve without isolating the system via isolation valves; and a first pipe freezing apparatus placed around a pipe downstream of the valve, wherein the valve press device allows for an effective freeze provided by the pipe freezing apparatus due to abatement of water rushing past the pipe freezing apparatus.

The invention in this aspect is additionally characterized wherein comprising a test port configured to the valve press device, the test port for determining if an acceptable freeze has been provided by the first pipe freezing apparatus. A second pipe freezing apparatus is connected upstream of the valve further avoiding having to secure an entire water main for maintenance.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF PREFERRED EMBODIMENTS

Figure 1:
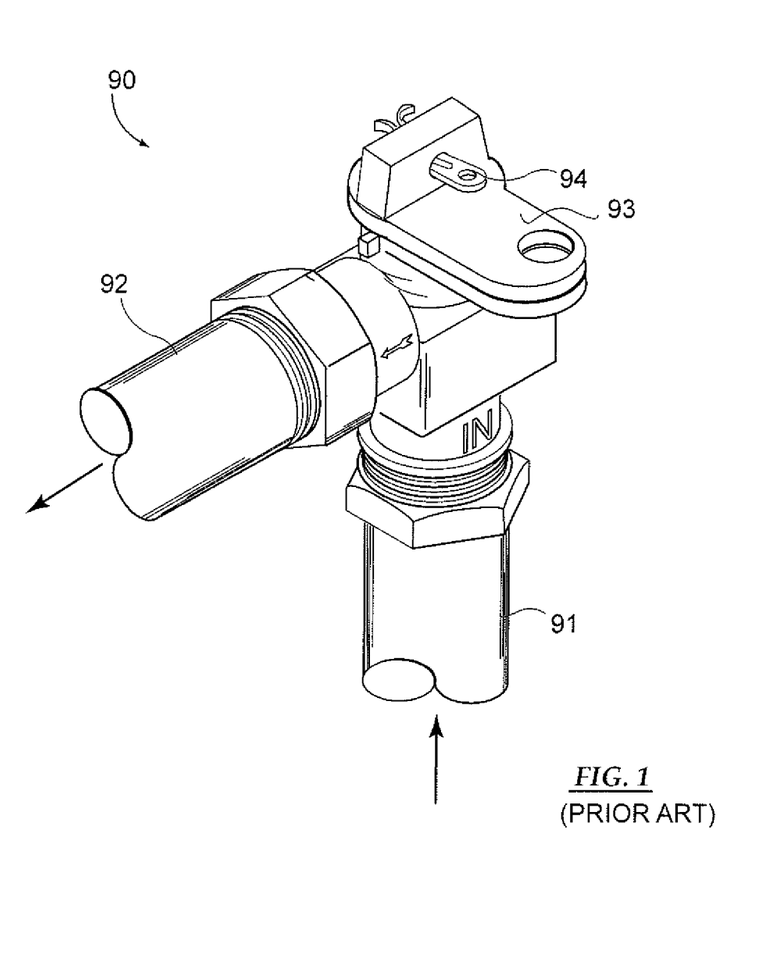
FIG. 1 is a prior art view of a prior art stop valve needing to be replaced.
Figure 2:
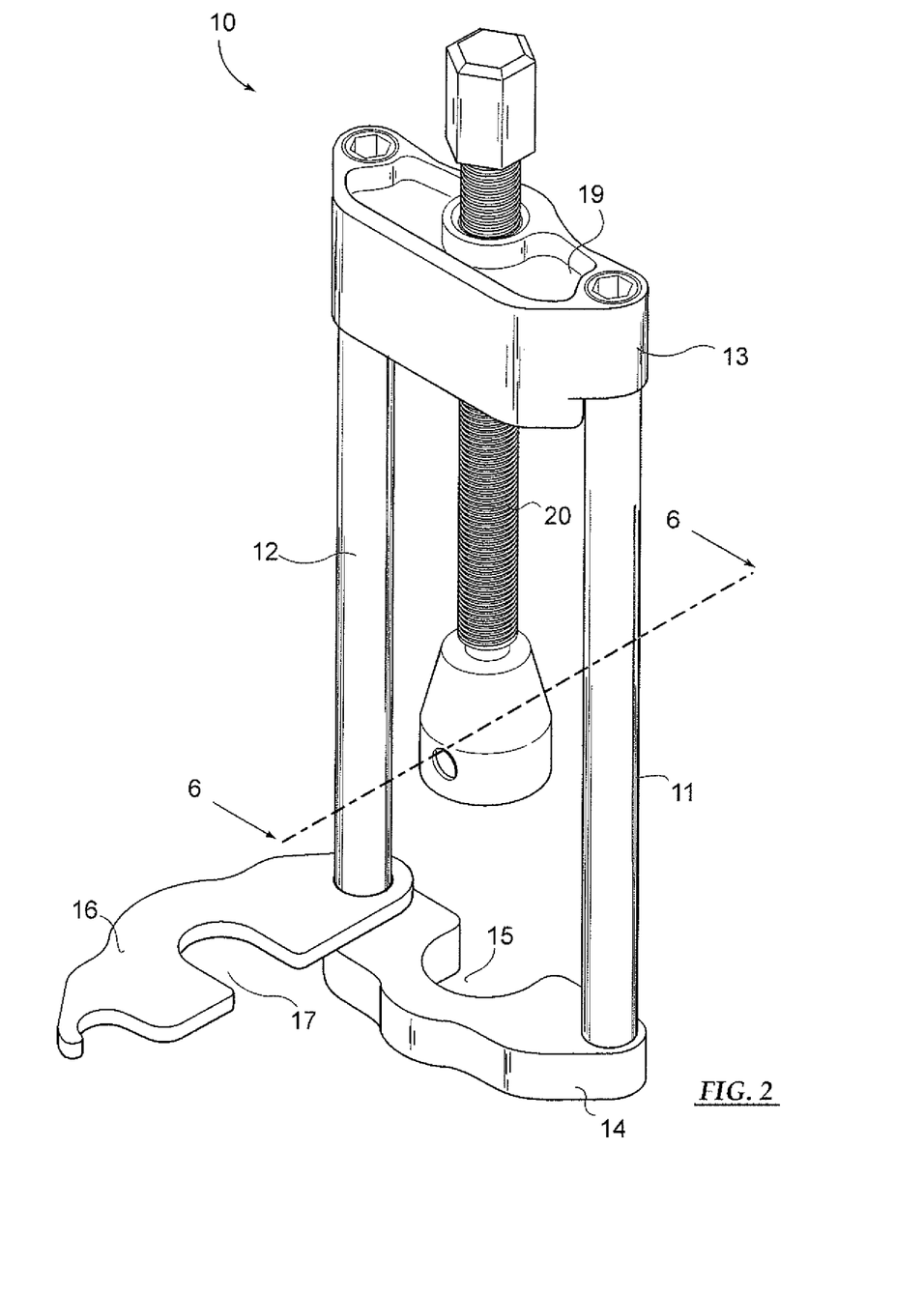
FIG. 2 is a first perspective view of a preferred valve press assembly shown not in use.

Initially with regard to FIG. 1, a pipe system valve 90 is illustrated requiring maintenance assisted by the present invention. The valve comprises an inlet 91 and an outlet 92 in addition to a valve operator 93 held in place by a pin 94. Over time, installed valves 90 become worn, broken or damaged resulting in leakage past a valve stem and around the area of the valve operator 93. The maintenance may be performed by using one or more pipe freezing apparatuses (see FIG. 10, for e.g.) rather than isolating the system by closing surrounding valves. However, if the damaged valve is leaking too much, the rushing water is less likely to freeze thereby not providing an effective seal as needed. Therefore, a press device 10 (FIG. 2) of the present invention is employed to provide leakage abatement in the preferred embodiment. FIG. 2 provides a first perspective view of a preferred valve press assembly shown not in use.

Regarding FIG. 2, the valve press apparatus 10 has an outer structural frame 11, 12, 13, 14. More specifically, the outer frame 10 includes first 11 and second 12 lateral stanchions together with upper 13 and lower 14 horizontal beam portions forming a frame of said device 11, 12, 13, 14. Importantly providing pressure from underneath, an abutment surface 14, 16, is configured to the lower horizontal beam surface (either on an inside surface of the lower horizontal beam 14, itself, or alternatively on a hinged pipe size adaptor 16). In the deployed position, the abutment surface 14, 16 is juxtaposed to a suitable portion on a pipe 91 (e.g. valve coupling above 91) or the valve 90 itself to be maintained.

FIG. 2 further illustrates semi-circular carve-outs 15, 17 that allow for different size pipe 91 diameters. The carve-out 15 configured to the lower horizontal beam 14 has a larger diameter than the carve-out 17 associated with the hinged pipe size adaptor 16. Accordingly, the adaptor 16 is rotated away about its hinge for larger pipe 91 diameters. Also, the upper beam 13 comprises a carve-out 19 to assist in grasping and molding the device 10.

Figures 3, 4:
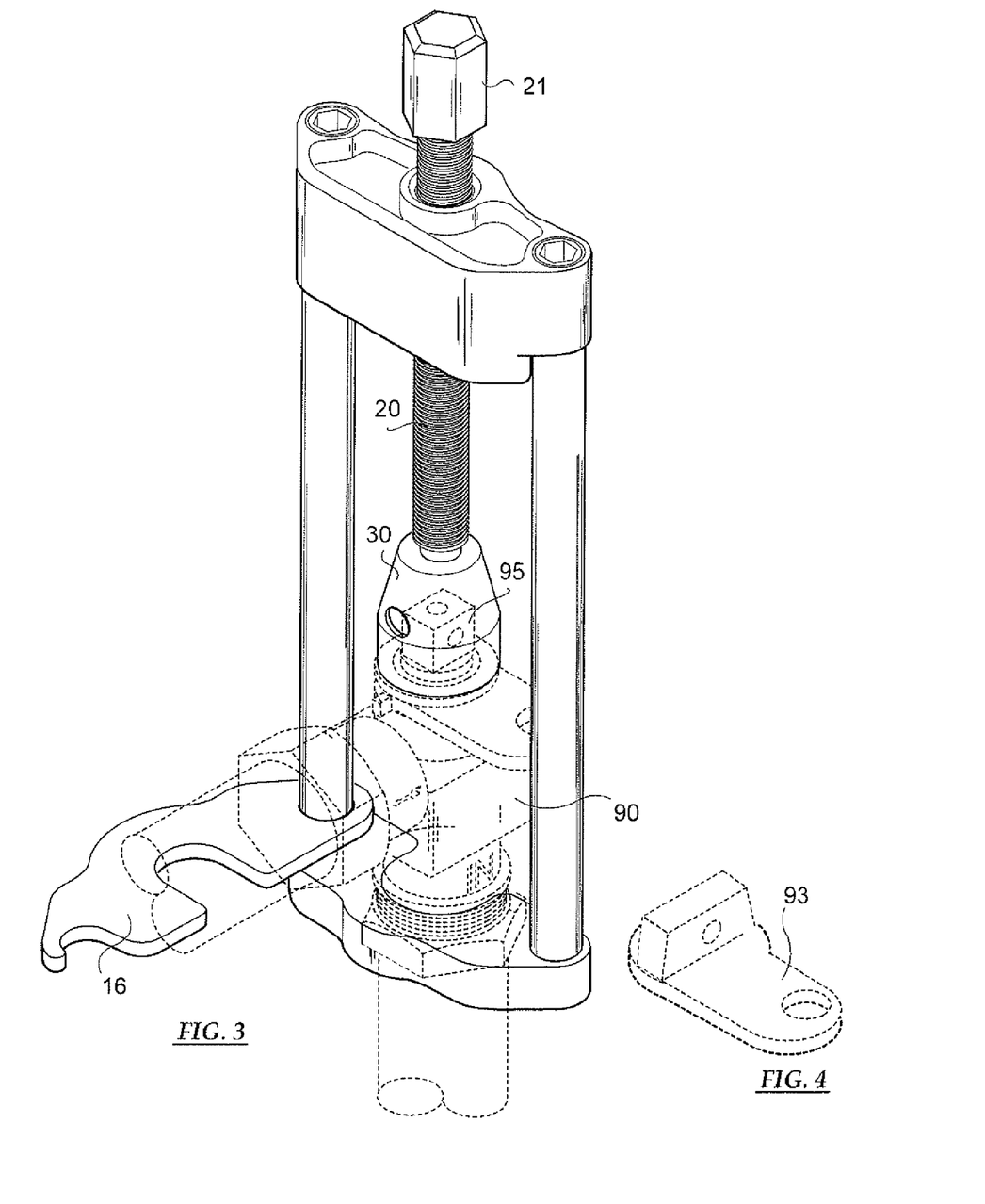
FIG. 3 is a perspective illustration of the preferred valve press device in an exemplary deployed position.
FIG. 4 illustrates a stop the is valve operator that is typically removed in the preferred configuration.
Figure 5:
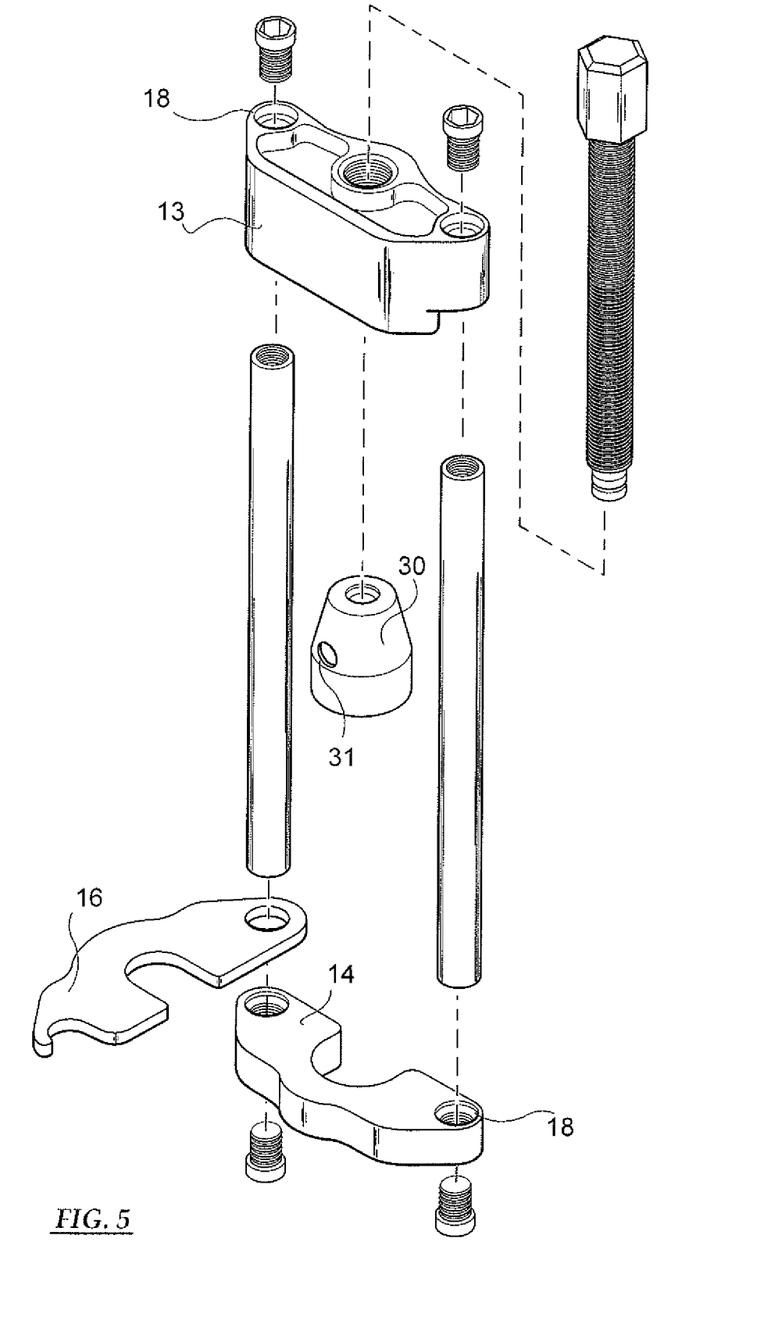
FIG. 5 is an exploded view of the first preferred embodiment of the present invention.

Also with regard to FIG. 3, pressure is applied to the valve 90 from above via a forcing screw 20 translationally coupled trough 18 the upper horizontal beam 13 (FIG. 5). The forcing screw provides pressure to a top of the valve 90 leveraged against the abutment surface 14, 16, wherein said pressure assists in creating a seal at the valve leakage or downstream to the valve leakage. The forcing screw 20 is configured with a hex nut or eight sided head 21 that may be hand tightened or tightened with a wrench. As shown in FIG. 4, the valve operator 94 is typically removed before the press device 10 is employed.

With regard to FIG. 5, an exploded view of the first preferred embodiment 10 of the present invention is shown. In this configuration, the lateral stanchions 11, 12 are hollow member with thread configured to an interior thereto. They 11, 12 fit through apertures 18 in the upper 13 and lower 14 beams and are secured with threaded bolts.

Figure 6:
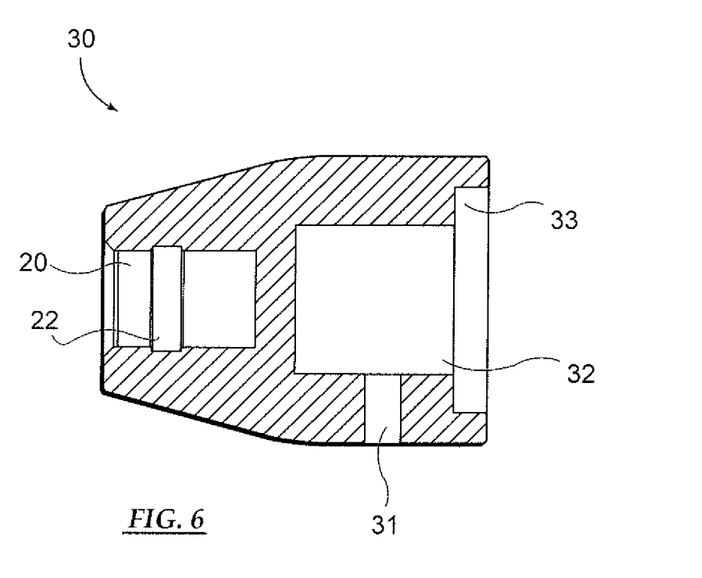
FIG. 6 is a cross sectional view of a socket of the present invention taken along line 6-6 in FIG. 2.

FIG. 6 provides a cross sectional view of the socket 30 of the present invention taken along line 6-6 in FIG. 2. As stated, the forcing screw 20 provides pressure to the top of the valve 90 via the socket 30 m specifically designed to fit over the top of the valve. The socket 30 initially comprises an o-ring 22 for coupling the socket 30 to the forcing screw 20. It 30 also has a semi-hollow interior 32, 33 configured to fit over the upper portion of the valve (FIG. 3). A test port for determining if a pipe freezing apparatus is working is provided. If there is not a proper freeze, then water will leak past the top of the valve 90 and out the test port 30 via the hollow interior 32, 33. (See also, FIG. 10). More specifically, the semi-hollow interior further comprises a lower hollow interior 33 providing a first seal to the top of the valve; and an upper hollow interior 32 having a smaller diameter than the lower hollow interior 33. The upper hollow interior 32 provides a second seal to the top of the valve 90.

Figures 7, 8, 9:
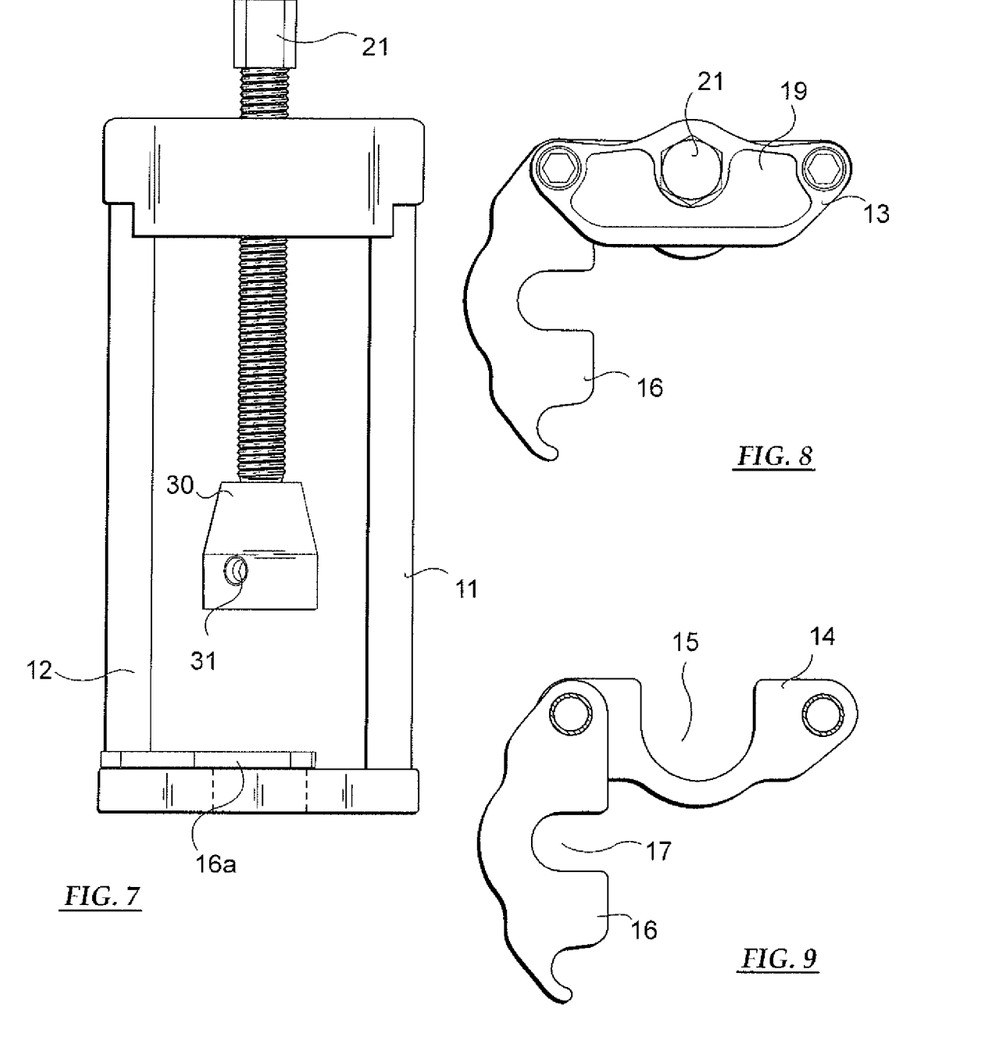
FIG. 7 is a front plan view of a second preferred press device embodiment.
FIG. 8 is a top plan view the first preferred press device.
FIG. 9 is a top plan view of only a lower beam of the present invention with a pipe size adaptor.

With regard to FIG. 7 through FIG. 9, there are a couple of configurations for the pipe size adaptor 16, 16a providing versatility to the press device fitting different sized pipes. The first embodiment 16 provides a second carve to conveniently fit around the first 11 lateral stanchion. The second 16a essentially removes this feature as shown in FIG. 7. As stated, the pipe size adaptor 16, 16a is hingedly connected to a lower area of the press device (more specifically the second stanchion 12), wherein further the pipe size adaptor is the abutment surface in an in-use position.

Figure 10:
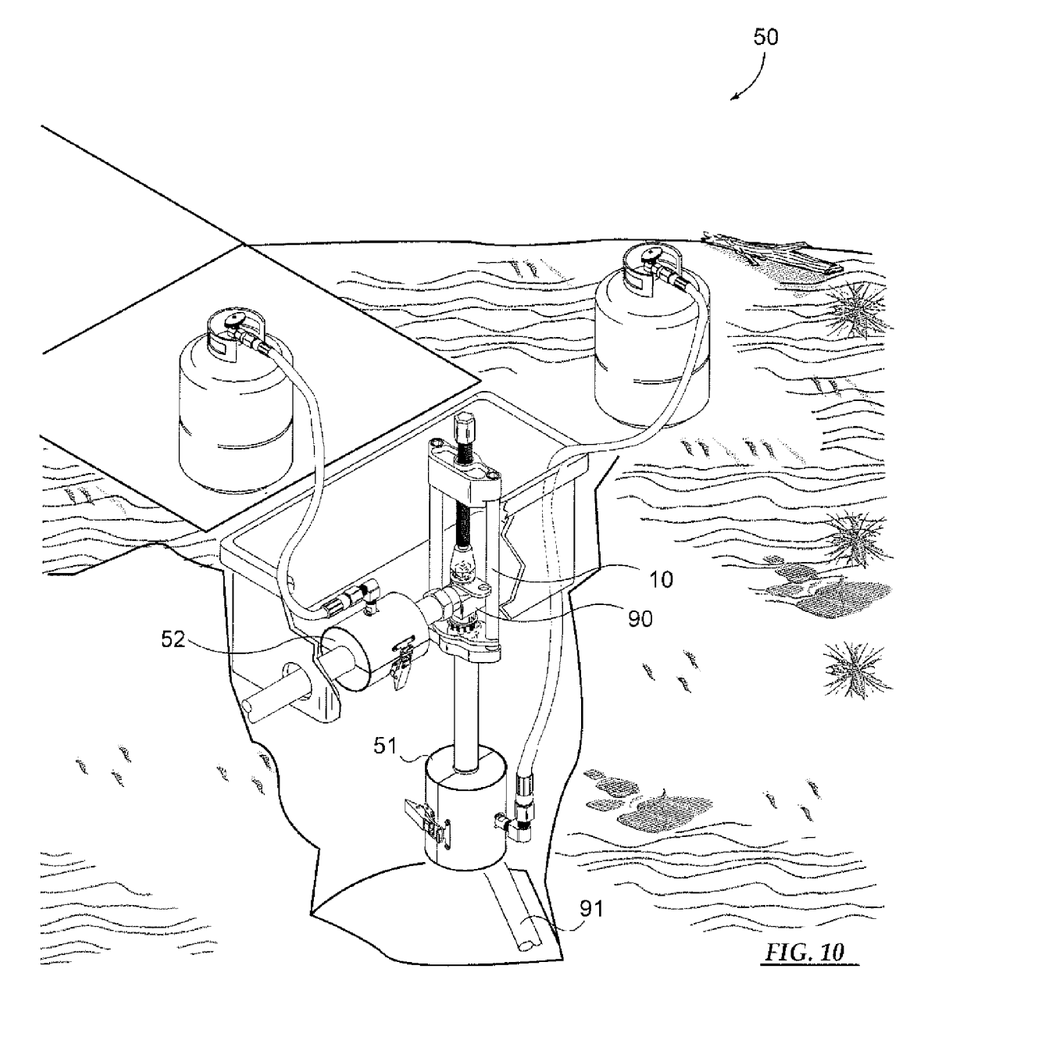
FIG. 10 is an illustration of a system for performing pipe maintenance of the present invention.

FIG. 10 provides an illustration of a system 50 for performing pipe maintenance of the present invention using one or more pipe freezing apparatuses 51, 52. More specifically, the system for performing pipe maintenance 50 comprises a valve press device 10 placed around a valve 90 for temporary leakage abatement, wherein the pipe maintenance specifically comprises replacing the valve without isolating the system via isolation valves (i.e. upstream and downstream). The system 50 further includes a first pipe freezing apparatus 51 placed around a pipe upstream of the valve 90. The press device 10 is important to the system 50 because it allows for an effective freeze provided by the pipe freezing apparatus 51 due to abatement of water rushing past the pipe freezing apparatus 51. A second pipe freezing apparatus 52 is connected to the pipe upstream of the valve 90 for the same reason, to avoid having to secure and entire water main to provide pipe maintenance.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

While the particular Press Device for Valve Maintenance as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A press device for valve leakage abatement, comprising:
    an outer frame of the device comprising a plurality of horizontal and vertical portions;
    an abutment surface configured on a lower portion of the outer frame, the abutment surface juxtaposed to a suitable portion on an underside of the valve to be maintained; and
    a forcing screw translationally configured to the outer frame, the forcing screw providing pressure to a top of a valve leveraged against the abutment surface, wherein said pressure assists in creating a seal at the valve leakage or downstream to the valve leakage.

2. The press device for valve leakage abatement of claim 1, wherein the forcing screw provides pressure to a top of the valve via a socket specifically designed to fit over the top of the valve.

3. The press device for valve leakage abatement of claim 1, further comprising a hinged pipe size adaptor providing versatility to the press device fitting different sized pipes, wherein said pipe size adaptor is hingedly connected to the lower portion of the outer frame, wherein further the pipe size adaptor is the abutment surface in an in-use position.

4. The press device for valve leakage abatement of claim 1, the forcing screw further comprising a forcing screw head at an upper end thereof, the forcing screw head configured to be hand tightened or tightened via a tool.

5. The press device for valve leakage abatement of claim 2, the socket further comprising:
    an o-ring for coupling the socket to the forcing screw;
    a semi-hollow interior configured to fit over the upper portion of the valve; and
    a test port for determining if a pipe freezing apparatus is working.

6. The press device for valve leakage abatement of claim 5, the semi-hollow interior further comprising:
    a lower hollow interior providing a first seal to the top of the valve; and
    an upper hollow interior having a smaller diameter than the lower hollow interior, the upper hollow interior providing a second seal to the top of the valve.

7. A press device for valve leakage abatement, comprising:
    an upper horizontal beam portion;
    a lower horizontal beam substantially parallel to the upper horizontal beam portion;
    first and second lateral stanchions together with the upper and lower horizontal beam portions forming a frame of said device;
    an abutment surface configured to the lower horizontal beam surface, the abutment surface juxtaposed to a suitable portion on a pipe to be maintained; and
    a forcing screw translationally coupled trough the upper horizontal beam, the forcing screw providing pressure to a top of a valve leveraged against the abutment surface, wherein said pressure assists in creating a seal at the valve leakage or downstream to the valve leakage.

8. The press device for valve leakage abatement of claim 7, wherein the forcing screw provides pressure to a top of the valve via a socket specifically designed to fit over the top of the valve.

9. The press device for valve leakage abatement of claim 7, further comprising a hinged pipe size adaptor providing versatility to the press device fitting different sized pipes, wherein said
    pipe size adaptor is hingedly connected to a lower area of the press device, wherein further the pipe size adaptor is the abutment surface in an in-use position.

10. The press device for valve leakage abatement of claim 7, the upper and lower horizontal beams each further comprising a pair of apertures for fixedly receiving ends of each of the first and second stanchions.

11. The press device for valve leakage abatement of claim 7, the forcing screw further comprising a forcing screw head at an upper end thereof, the forcing screw head configured to be hand tightened or tightened via a tool.

12. The press device for valve leakage abatement of claim 7, the upper beam comprising a carve-out to assist in grasping and molding the device.

13. The press device for valve leakage abatement of claim 8, the socket further comprising:
    an o-ring for coupling the socket to the forcing screw;
    a semi-hollowing interior configured to fit over the upper portion of the valve; and
    a test port for determining if a pipe freezing apparatus is working.

\* \* \* \* \*